(12) United States Patent
Fujihara et al.

(10) Patent No.: US 8,851,570 B2
(45) Date of Patent: Oct. 7, 2014

(54) SEAT LIFTER AND SEAT

(75) Inventors: Masaru Fujihara, Fuchu-cho (JP); Jun Fukuda, Fuchu-cho (JP); Yasukazu Oki, Fuchu-cho (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 257 days.

(21) Appl. No.: 13/214,437

(22) Filed: Aug. 22, 2011

(65) Prior Publication Data

US 2012/0049598 A1    Mar. 1, 2012

(30) Foreign Application Priority Data

Sep. 1, 2010   (JP) ................................ 2010-195570
Jun. 15, 2011  (JP) ................................ 2011-133034

(51) Int. Cl.
*A47C 1/00* (2006.01)
*B60N 2/16* (2006.01)

(52) U.S. Cl.
CPC .............. B60N 2/1615 (2013.01); B60N 2/168 (2013.01); B60N 2/1655 (2013.01); *B60N 2205/50* (2013.01)
USPC ................. 297/344.15; 297/344.17

(58) Field of Classification Search
USPC ............... 297/344.15, 344.17, 344.16, 463.2, 297/344.13
See application file for complete search history.

(56) References Cited

U.S. PATENT DOCUMENTS

| | | | | |
|---|---|---|---|---|
| 3,712,573 A * | 1/1973 | Pickles | ........................ | 248/394 |
| 4,648,575 A * | 3/1987 | Kawade | ........................ | 248/371 |
| 4,765,582 A * | 8/1988 | Babbs | ........................ | 248/394 |
| 4,767,157 A * | 8/1988 | Kazaoka et al. | ........................ | 297/322 |
| 5,203,532 A * | 4/1993 | Matsuura | ........................ | 248/394 |
| 6,158,811 A * | 12/2000 | Hofschulte et al. | ........................ | 297/362 |
| 6,164,720 A * | 12/2000 | Haglund | ........................ | 297/216.1 |
| 6,273,172 B1* | 8/2001 | Frey | ........................ | 160/67 |
| 6,290,198 B1* | 9/2001 | Kojima et al. | ........................ | 248/422 |
| 6,340,208 B1* | 1/2002 | Habedank | ........................ | 297/322 |
| 6,460,802 B1* | 10/2002 | Norris | ........................ | 244/17.11 |
| 6,464,193 B1* | 10/2002 | Nemoto | ........................ | 248/421 |
| 6,666,423 B1* | 12/2003 | Nemoto | ........................ | 248/421 |
| 7,600,801 B2* | 10/2009 | Lehy et al. | ........................ | 296/65.08 |
| 8,132,658 B2* | 3/2012 | Kawai et al. | ........................ | 192/223.2 |
| 8,171,823 B2* | 5/2012 | Koga et al. | ........................ | 74/650 |
| 8,424,665 B2* | 4/2013 | Kawai et al. | ........................ | 192/223.2 |

(Continued)

FOREIGN PATENT DOCUMENTS

DE    102007017617   *   5/2008
EP    1055549    11/2000

(Continued)

*Primary Examiner* — David E Allred
(74) *Attorney, Agent, or Firm* — Gerald E. Hespos; Michael J. Porco; Matthew T. Hespos

(57) ABSTRACT

A seat lifter smoothly lifts and lowers right and left seat frames relative to respective base members so that a seat can be lifted and lowered smoothly. The seat lifter has first to fourth links (4a to 4d), and a coupling (6) that couples the first link (4a) and the second link (4b), and has a first sun gear (62) and a second sun gear (162). The first link (4a) has a first link body (41) that is coupled interlockably to a first planetary gear group (40) with a plurality of first planetary gears (44), and a planetary-gear operating section (5). The second link (4b) has a second link body (141) that is coupled interlockably to a second planetary gear group (140) with a plurality of second planetary gears (144).

6 Claims, 10 Drawing Sheets

(56) References Cited

U.S. PATENT DOCUMENTS

| | | |
|---|---|---|
| 8,579,756 B2* | 11/2013 | Oki .................................. 475/300 |
| 2003/0132595 A1* | 7/2003 | Fabiano et al. ................ 280/166 |
| 2004/0155469 A1* | 8/2004 | Homann et al. .............. 292/201 |
| 2005/0184549 A1* | 8/2005 | Robinson et al. ........... 296/65.03 |
| 2008/0231087 A1* | 9/2008 | Holdampf ........................ 297/15 |
| 2010/0060061 A1* | 3/2010 | Koga et al. .................. 297/344.1 |
| 2010/0060062 A1* | 3/2010 | Koga et al. .................. 297/344.1 |
| 2010/0139425 A1* | 6/2010 | Schulz et al. ...................... 74/63 |
| 2012/0046138 A1* | 2/2012 | Hana et al. ........................ 475/72 |
| 2012/0150154 A1* | 6/2012 | Brisson et al. ..................... 606/1 |
| 2013/0137545 A1* | 5/2013 | Oki ................................ 475/300 |

FOREIGN PATENT DOCUMENTS

| | | | |
|---|---|---|---|
| EP | 2596984 | * | 5/2013 |
| JP | 58-209630 | | 12/1983 |
| JP | 60-164439 | | 10/1985 |
| WO | WO 2008052761 A1 | * | 5/2008 |

* cited by examiner

SEAT LIFTER AND SEAT

BACKGROUND OF THE INVENTION

1. Field of the Invention

The present invention relates to a seat lifter for lifting and lowering a seat, such as an automobile seat, and a seat having the seat lifter.

2. Description of the Related Art

Heretofore, there has been widely known a seat lifter which comprises a lifting and lowering mechanism section for lifting and lowering a seat. For example, such a seat lifter is disclosed in Japanese Utility Model Laid-Open Publication No. 60-164439.

A seat lifter disclosed in Japanese Utility Model Laid-Open Publication No. 60-164439 comprises: right and left links each rotatably coupled to a respective one of two right and left base members and further to a respective one of two right and left seat frames disposed just above the respective base members, wherein the right and left links are coupled to each other through a shaft (coupling member); and a single lifting and lowering mechanism section adapted to lift and lower the right seat frame with respect to the right base member. The lifting and lowering mechanism section includes a sector gear rotatably attached to a longitudinally central region of an inner surface of the right seat frame, a coupling rod coupling the right link and the sector gear, and a center gear meshed with the sector gear.

The center gear is adapted to be manipulatively rotated so as to swingably move the right link through the sector gear and the coupling rod, whereby the right seat frame is lifted or lowered with respect to the right base member. On the other hand, the left seat frame is adapted to be lifted or lowered in such a manner that it is pushed upwardly or downwardly by an end of the shaft moved along with the lifting or lowering of the right seat frame.

However, in the seat lifter as disclosed in Japanese Utility Model Laid-Open Publication No. 60-164439, only the right seat frame is manipulatively lifted or lowered by the lifting and lowering mechanism section composed of the sector gear, the coupling rod and the center gear, and the left seat frame is lifted or lowered in such a manner that it is pushed upwardly or downwardly by the end of the shaft moved along with the lifting or lowering of the right seat frame. Thus, it is difficult to adequately lift and lower the left seat frame, which causes a problem of difficulty in smoothly lifting and lowering a seat.

It is an object of the present invention to provide a seat lifter capable of smoothly lifting and lowering both right and left seat frames with respect to respective base members so as to allow a seat to be smoothly lifted and lowered, and further provide a seat having the seat lifter.

SUMMARY OF THE INVENTION

In order to achieve the above object, according to one aspect of the present invention, there is provided a seat lifter (1), which comprises: a first link (4a) rotatably coupled to each of a first base member (2a) and a first seat frame (3a) which are disposed on one of right and left sides of a seat (100); a second link (4b) rotatably coupled to each of a second base member (2b) and a second seat frame (3b) which are disposed on the other side of the seat (100), and interlockably coupled to the first link (4a) through a coupling member (6); and a lifting and lowering mechanism section for lifting and lowering the first and second seat frames (3a, 3b) with respect to the first and second base members (2a, 2b). The lifting and lowering mechanism section includes: a first lifting and lowering mechanism section having a first sun gear (62) and a first planetary gear group (40) to lift and lower the first seat frame (3a) with respect to the first base member (2a); and a second lifting and lowering mechanism section having a second sun gear (162) and a second planetary gear group (140) to lift and lower the second seat frame (3b) with respect to the second base member (2b) in interlocking relation with the first lifting and lowering mechanism section.

In the seat lifter of the present invention, when the first seat frame (3a) is lifted and lowered with respect to the first base member (2a) by the first lifting and lowering mechanism section having the first sun gear (62) and the first planetary gear group (40), the second seat frame (3b) can be lifted and lowered with respect to the second base member (2b) by the second lifting and lowering mechanism section having the second sun gear (162) and the second planetary gear group (140), in an interlocking manner. This makes it possible to smoothly lift and lower the first and second seat frames (3a, 3b) with respect to respective ones of the first and second base members (2a, 2b).

These and other objects, features and advantages of the present invention will become apparent upon reading the following detailed description along with the accompanying drawings.

DETAILED DESCRIPTION OF THE PREFERRED EMBODIMENTS

Figure 1:
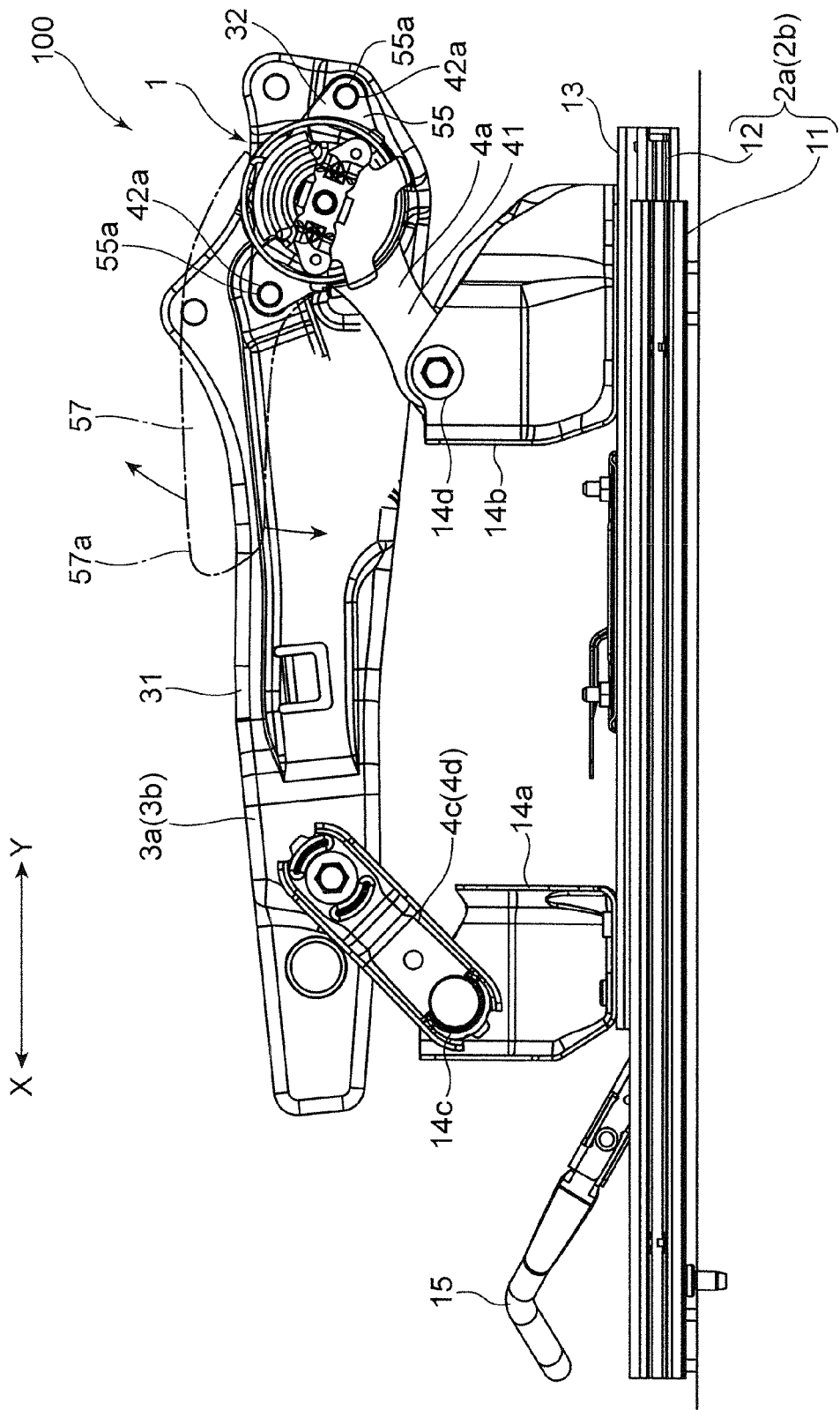
FIG. 1 is a side view illustrating a part of an automobile seat incorporating an automobile seat lifter according to one embodiment of the present invention.
Figure 2:
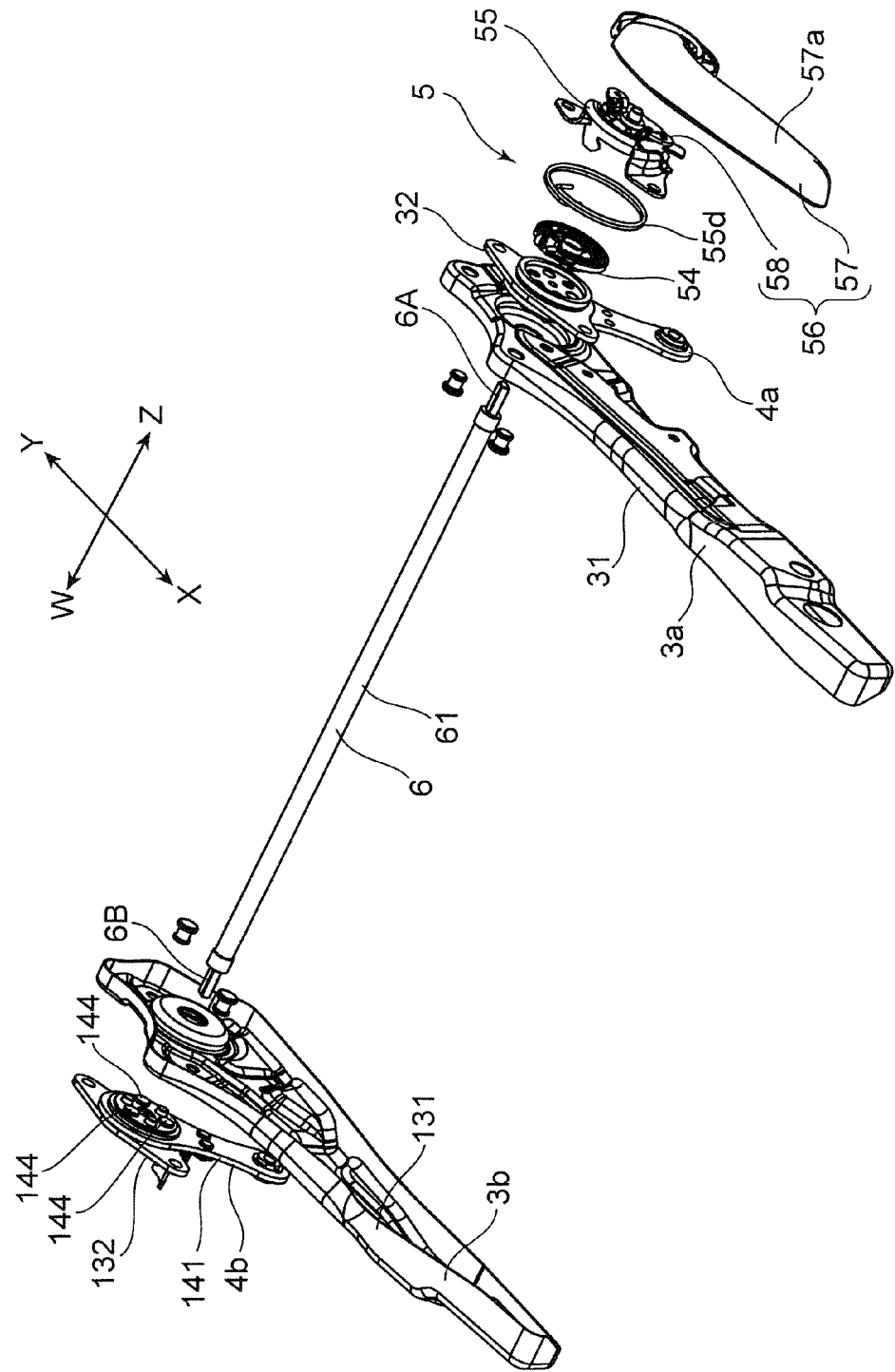
FIG. 2 is an exploded perspective view illustrating a part of the automobile seat in FIG. 1, wherein a base member is omitted.
Figure 3:
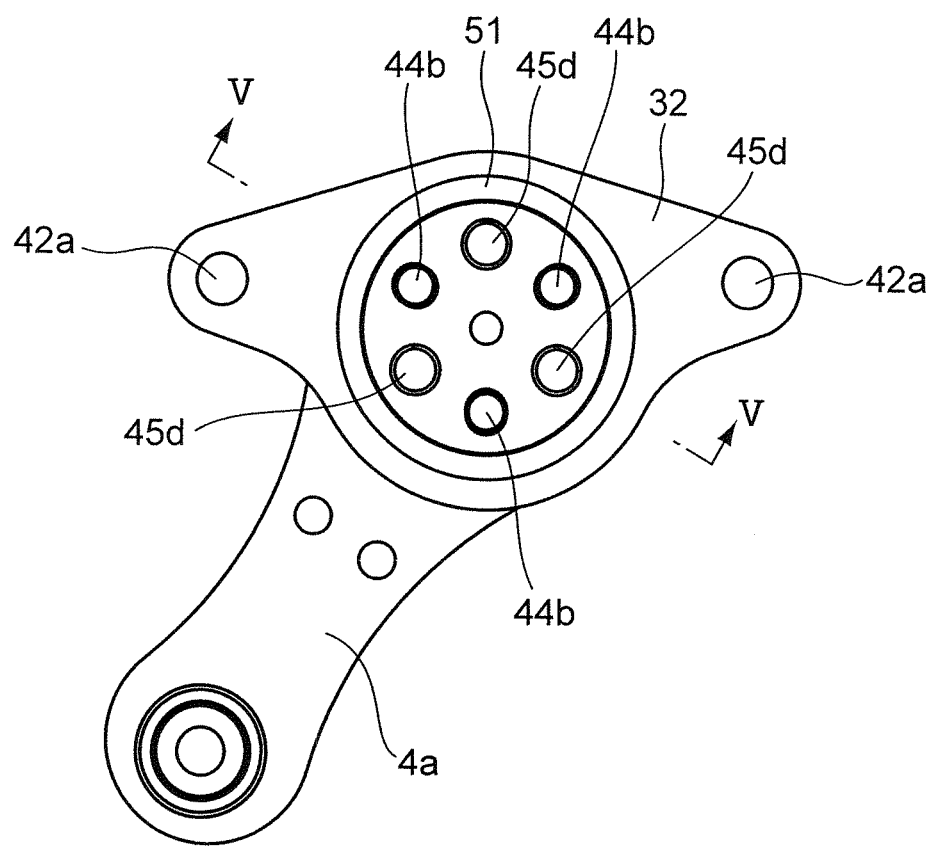
FIG. 3 is a side view illustrating a coupled state between a first link and a first-link coupling section of a first seat frame.

With reference to the drawings, the present invention will now be specifically described based on an embodiment thereof. FIG. 1 is a side view illustrating a part of an automobile seat incorporating an automobile seat lifter according to one embodiment of the present invention, and FIG. 2 is an exploded perspective view illustrating a part of the automobile seat in FIG. 1, wherein a base member is omitted. The following description will be made on an assumption that the X direction, Y direction, the Z direction and the W direction in the drawings correspond to a frontward direction, a rearward direction, a leftward direction and a rightward direction, respectively.

The seat lifter 1 according to this embodiment is used in an automobile seat, for example, a driver seat or front passenger seat (in this embodiment, a front passenger seat) of an automobile. The automobile seat 100 in this embodiment is equipped with a first base member 2a, a second base member 2b, a first seat frame 3a, a second seat frame 3b, and the seat lifter 1.

The first and second base members 2a, 2b are symmetrically arranged in spaced-apart relation to each other in a rightward-leftward direction (in FIG. 1, only the first base member 2a appears, but the second base member does not appear), and formed in substantially the same structure. Thus, only the first base member 2a will be described below, and the description of the second base member will be omitted.

The first base member 2a comprises a long lower rail 11, and an upper rail 12. The lower rail 11 is fixed onto a floor surface of an automobile body while aligning a longitudinal direction thereof with a frontward-rearward direction.

The upper rail 12 has a long upper rail body 13, and two brackets 14a, 14b each fixed onto the upper rail body 13. The upper rail body 13 is disposed just above the lower rail 11 displaceably along the longitudinal direction of the lower rail 11.

The upper rail body 13 and the lower rail 11 can be appropriately locked together by a non-illustrated lock/unlock device, and then the locked state can be released by manipulating an unlock operating section 15 provided in a front lower portion of the seat 100, so as to allow the upper rail body 13 to be displaced with respect to the lower rail 11 in the frontward-rearward direction.

The brackets include a front bracket 14a and a rear bracket 14b. The front bracket 14a has a lower portion fixed onto a front end of the upper rail body 13, and an upper portion formed as a link mounting portion 14c.

The rear bracket 14b has a lower portion fixed onto a rear end of the upper rail body 13, and an upper portion formed as a link mounting portion 14d.

The first seat frame 3a consists of a left lower seat frame segment constituting a part of a seat frame, and comprises a first frame body 31 disposed just above the first base member 2a, and a first-link coupling segment 32 serving as a first-link coupling section couplable to an aftermentioned first link member 4a of the seat lifter 1.

Figure 4A:
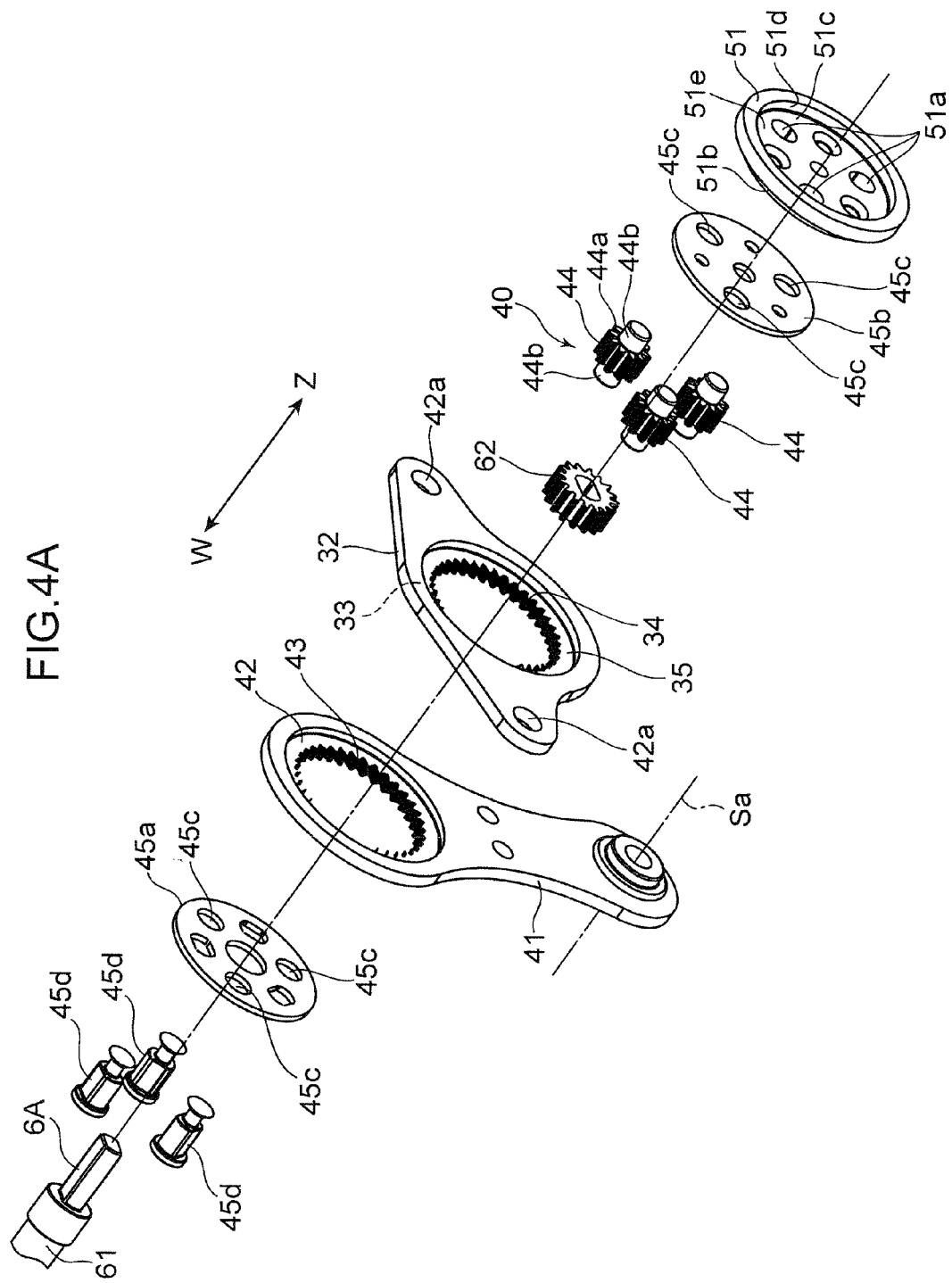
FIG. 4A is an exploded perspective view illustrating a portion corresponding to FIG. 3, when viewed from the side of the first link.
Figure 4B:
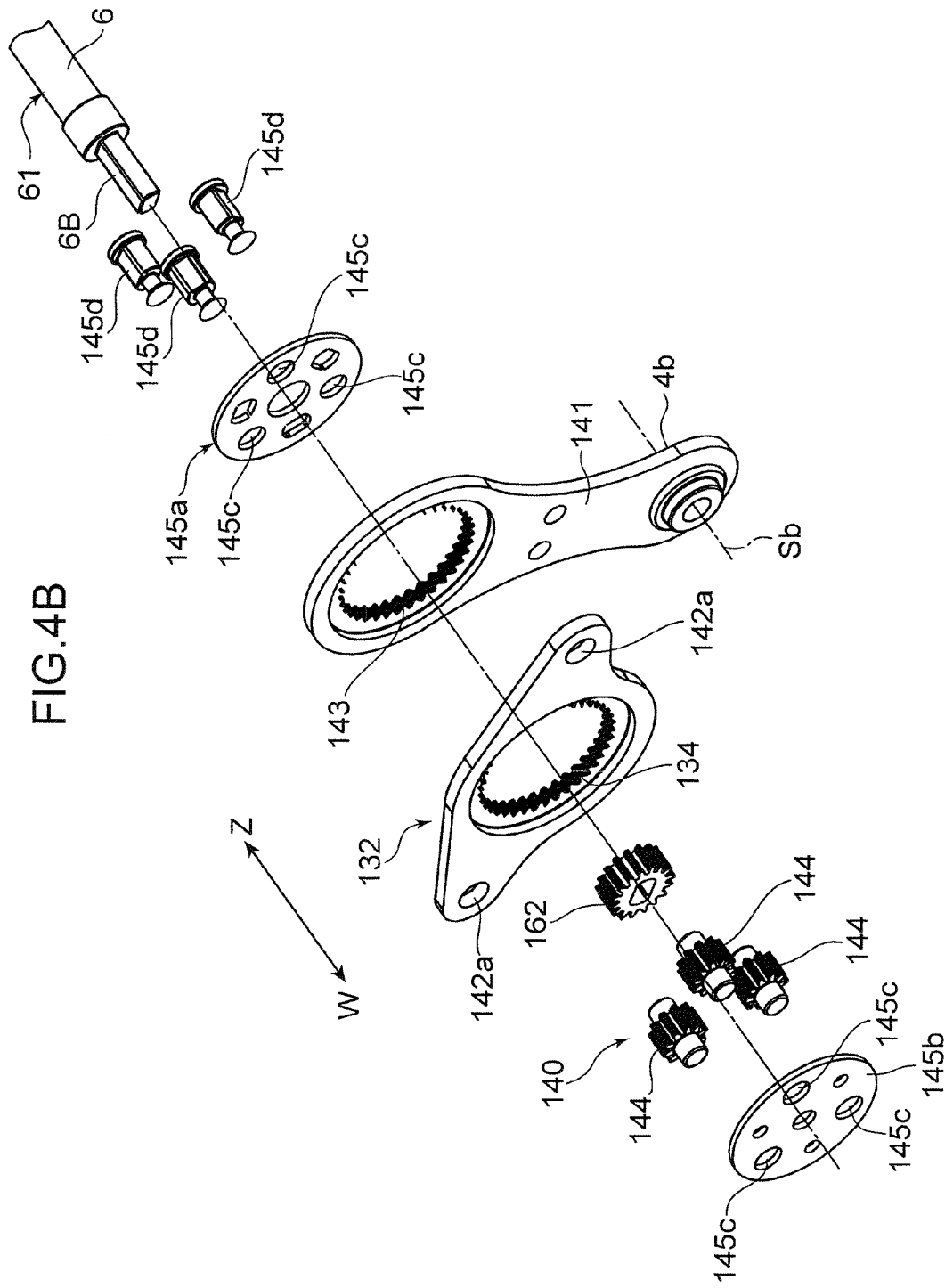
FIG. 4B is an exploded perspective view corresponding to FIG. 4A, when viewed from the side of a second link.
Figure 5:
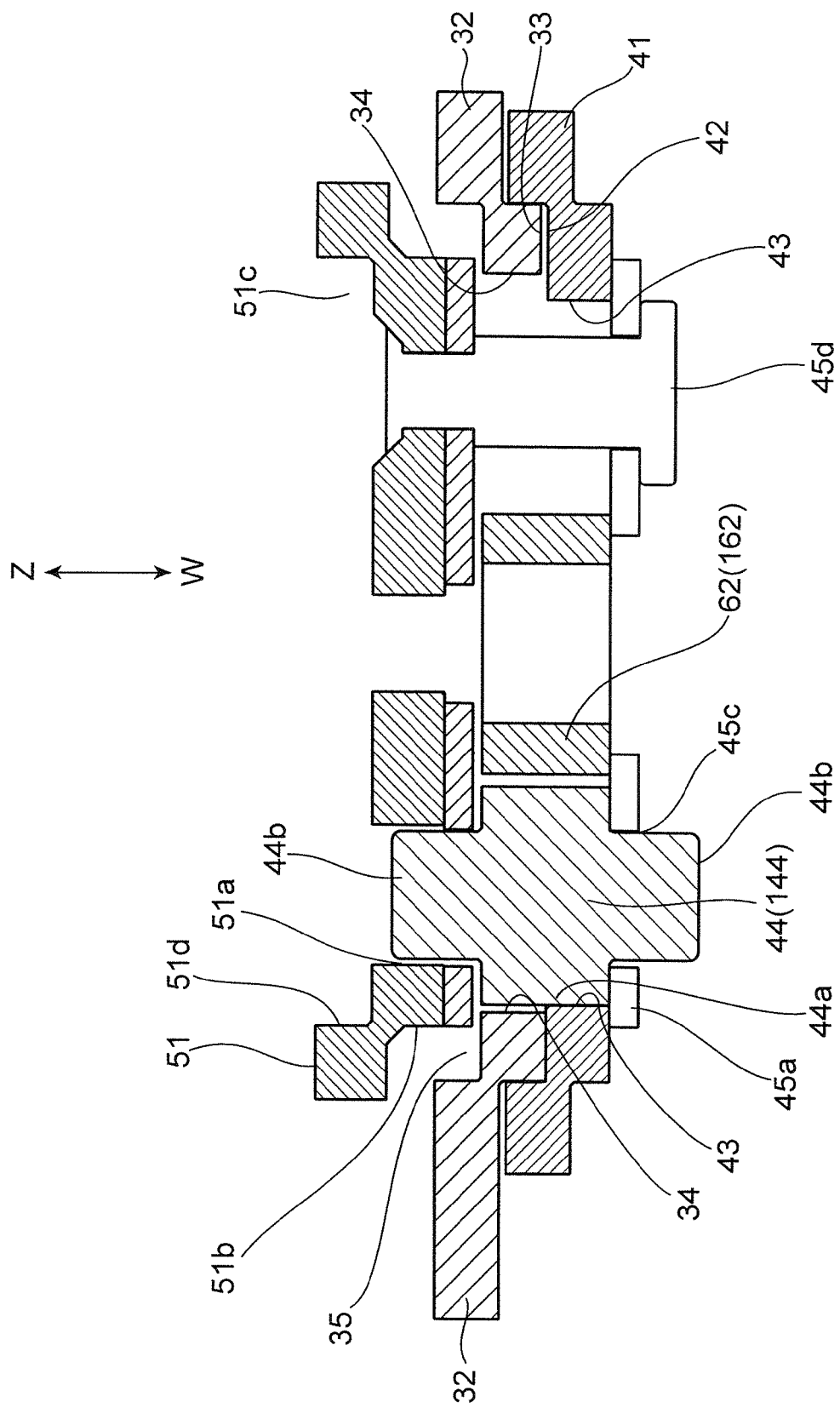
FIG. 5 is a sectional view taken along the line V-V in FIG. 3.

As illustrated in FIGS. 4 and 5, the first-link coupling segment 32 has a coupling convex portion 33 and a first-frame internal gear 34. The coupling convex portion 33 is provided to protrude circularly and rightwardly from a right lateral surface of the first-link coupling segment 32 by a given distance.

The first-frame internal gear 34 is provided on a radially inner side of the coupling convex portion 33. In this embodiment, it is formed to have thirty-eight teeth.

As illustrated in FIG. 1, the first-link coupling segment 32 has a front end and a rear end each fixed to the first frame body 31 through a fixing member, such as a bolt.

As illustrated in FIG. 2, the second seat frame 3b consists of a right lower seat frame segment constituting a part of the seat frame, and comprises a second frame body 131 disposed just above the second base member 2b, and a second-link coupling segment 132 serving as a second-link coupling section couplable to an aftermentioned second link member 4b of the seat lifter 1 and having a second-frame internal gear 134 (see FIG. 4B)

The second frame body 131 is formed to have a shape symmetrical to that of the first frame body 31 of the first seat frame 3a, and the second-link coupling segment 132 is formed to have a shape symmetrical to that of the first-link coupling segment 32.

The seat lifter 1 comprises first to fourth link members 4a to 4d, a coupling member 6 coupling the first link member 4a and the second link member 4b, and a lifting and lowering mechanism section for lifting and lowering the first seat frame 3a and the second seat frame 3b with respect to the first base member 2a and the second base member 2b.

As illustrated in FIG. 2, the coupling member 6 comprises a coupling shaft 61, a first sun gear 62 (illustrated in FIG. 4A) fixedly coupled to a left end (first end) of the coupling shaft 61, and a second sun gear 162 (see FIG. 4B) fixedly coupled to a right end (second end) of the coupling shaft 61.

In this embodiment, the first sun gear 62 is formed to have sixteen teeth. As illustrated in FIGS. 4 and 5, the first sun gear 62 is rotatably disposed within the first-frame internal gear 34.

The second sun gear 162 is formed to have the same structure as that of the first sun gear 62, and disposed within the second-frame internal gear 134 in such a manner that it is rotated interlockingly together with the first sun gear 62.

As illustrated in FIG. 1, the first link 4a is rotatably coupled to each of a rear portion of the first base member 2a and a rear portion of the first seat frame 3a. The first link 4a has a first link body 41 to which a first planetary gear group 40 (see FIGS. 4A and 5) having a plurality of first planetary gears 44, and a planetary-gear operating section 5, are attached.

The first link body 41 has a lower end (first end) rotatably coupled to the link mounting portion 14d of the rear bracket 14b of the first base member 2a.

As illustrated in FIGS. 4 and 5, the first link body 41 has an upper end (second end) provided with a coupling concave portion 42 rotatably coupled to the coupling convex portion 33 of the first-link coupling segment 32 to serve as a first-frame coupling portion, and a first-link internal gear 43 formed on an inner periphery of the coupling concave portion 42. The first-link internal gear 43 in this embodiment is formed to have thirty-five teeth.

The coupling concave portion 42 is formed to be depressed circularly from a left lateral surface of the first link body 41 to a given depth enough to allow the coupling convex portion 33 to be rotatably fitted thereinto.

In a state after the coupling concave portion 42 and the coupling convex portion 33 are coupled together, the first-link internal gear 43 and the first-frame internal gear 34 are arranged in adjacent side-by-side relation in a rightward-leftward direction.

In this embodiment, the number of the first planetary gears 44 is three, wherein each of the three first planetary gears 44 is formed in the same structure. Each of the first planetary gears 44 has a gear portion 44a, and a shaft portion 44b provided on opposite sides of the gear portion 44a.

The gear portion 44a is formed to have an axial length simultaneously meshable with both of the first-link internal gear 43 and the first-frame internal gear 34 arranged side-by-side in the rightward-leftward direction. In this embodiment, it is formed to have ten teeth.

The first planetary gears 44 are meshed with each of the first-frame internal gear 34, the first-link internal gear 43 and the first sun gear 62, while being arranged between the first-link internal gear 43 and the first sun gear 62 and between the first-frame internal gear 34 and the first sun gear 62, circumferentially at approximately even intervals.

In this state, the shaft portion 44b of each of the first planetary gears 44 is supported by two support members 45a, 45b disposed on opposite sides of an assembly of the first link body 41 and the first-link coupling segment 32.

Specifically, a circular disc-shaped first support members 45a and a circular disc-shaped second support members 45b are rotatably disposed, respectively, on a right side (in FIG. 4A, on a left side) of the first link body 41 and on a left side of the first-link coupling segment 32. Each of the first support members 45a and the second support members 45b has three shaft insertion holes 45c circumferentially arranged at even intervals.

A right end of each of the shaft portions 44b of the first planetary gears 44 is rotatably inserted into a respective one of the shaft insertion holes 45c of the first support member 45a, and a left end of the shaft portion 44b is rotatably inserted into a respective one of the shaft insertion holes 45c of the second support member 45b.

In a state after the shaft portions of the first planetary gears 44 are supported by the first support member 45a and the second support member 45b, each of three coupling pins 45d is installed between adjacent ones of the first planetary gears 44, so that the first support member 45a and the second support member 45b are coupled in a non-rotatable manner with respect to each other.

Figure 6:
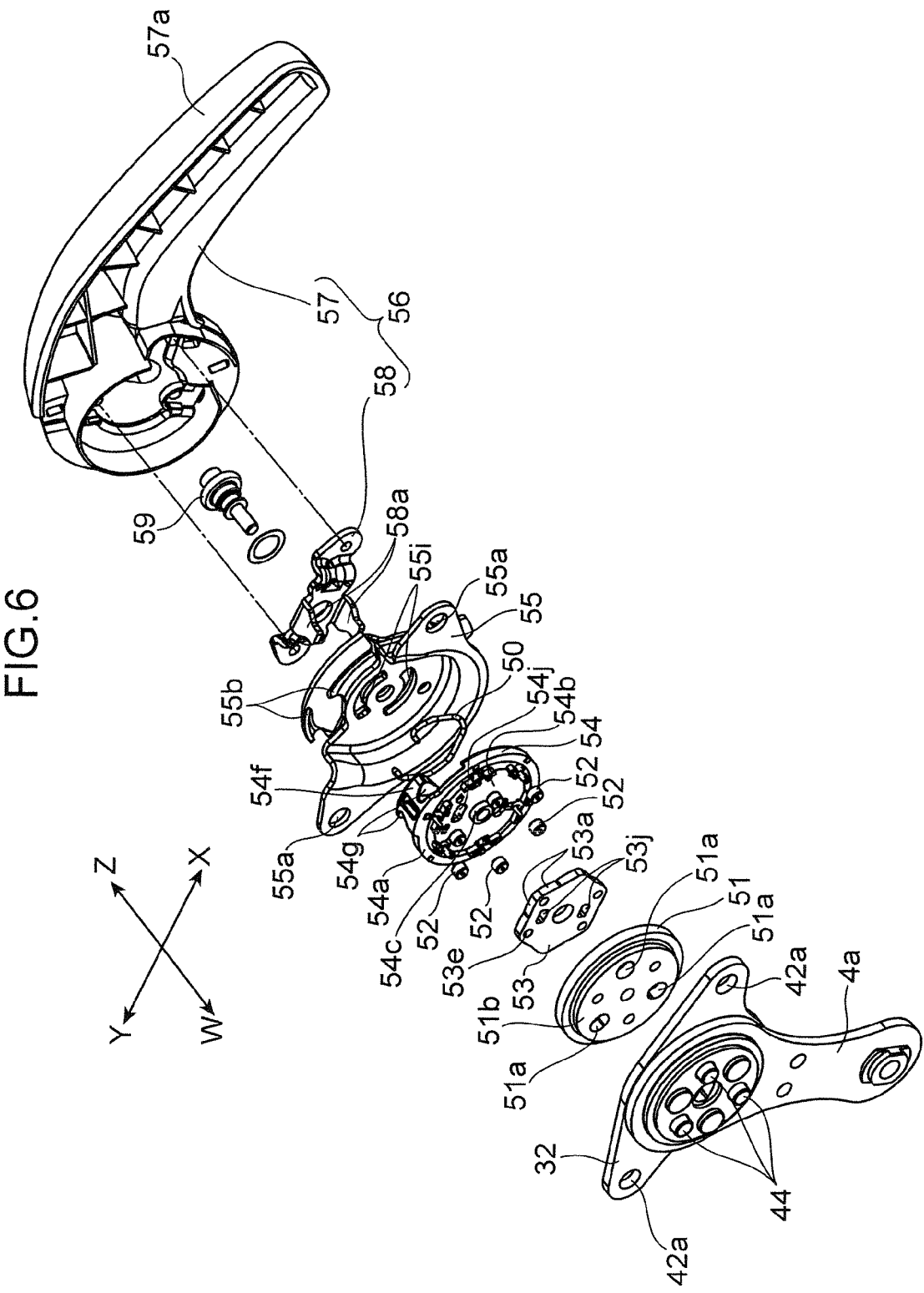
FIG. 6 is an exploded perspective view illustrating a planetary-gear operating section.

As illustrated in FIG. 6, the planetary-gear operating section 5 comprises a clutch device (51 to 55) and an operating lever 56. The clutch device includes a circular disc-shaped clutch plate 51, a cam 53, a holding member 54 which holds a plurality of rollers 52, and a casing 55 covering the holding member 54.

As illustrated in FIGS. 4 and 5, the clutch plate 51 has three shaft insertion holes 51a rotatably receiving respective ones of the shaft portions 44b of the first planetary gears 44, and a first-link-body coupling portion 51b on a right lateral surface thereof (in FIG. 5, it appears on a left side).

The first-link-body coupling portion 51b is formed to protrude circularly and rightwardly from the right lateral surface of the clutch plate 51 by a given distance. The shaft portions 44b of the first planetary gears 44 are rotatably inserted into respective ones of the three shaft insertion holes 51a, and the first-link-body coupling portion 51b is rotatably fitted into a receiving concave portion 35 of the first-link coupling segment 32 of the first link body, so that the clutch plate 51 is coupled to the first planetary gears 44, and rotatably coupled to the first-link coupling segment 32.

The clutch plate 51 has a left lateral surface provided with a receiving concave portion 51c (illustrated in FIG. 4A). The receiving concave portion 51c is formed to be depressed circularly from a left lateral surface of the clutch plate 51 to a given depth.

Figure 7A:
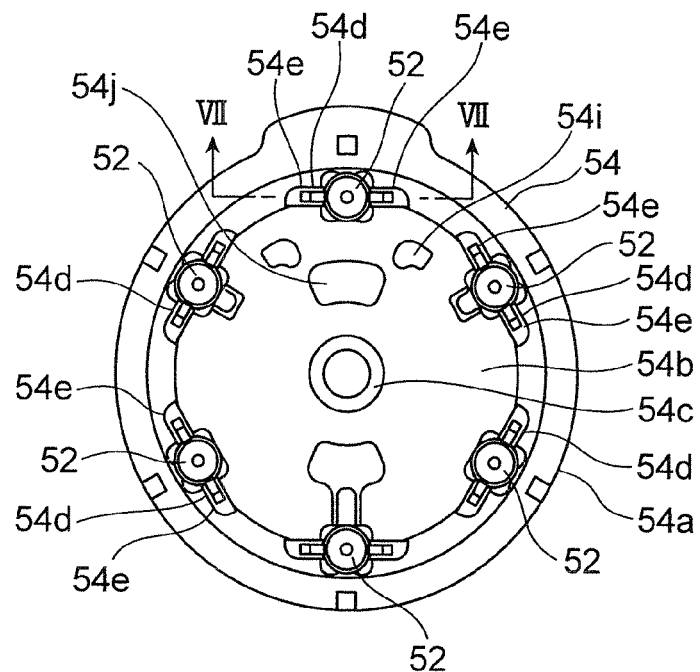
FIG. 7A is a side view illustrating a roller clamping portion holding a roller.
Figure 7B:
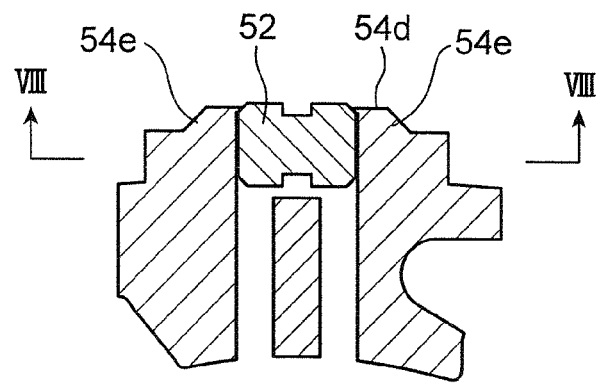
FIG. 7B is a sectional view taken along the line VII-VII in FIG. 7A.
Figure 7C:
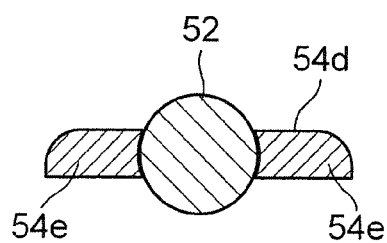
FIG. 7C is a sectional view taken along the line VIII-VIII in FIG. 7B.

As illustrated in FIGS. 6 and 7, the holding member 54 has an elastic disc-shaped portion 54a made of a synthetic resin. In this embodiment, the disc-shaped portion 54a is entirely made of Nylon (registered trade mark). The disc-shaped portion 54a has a cylindrical-shaped holding shaft 54c rotatably holding the cam 53, in a central region of a clutch plate-facing surface thereof, i.e., a right lateral surface thereof facing the receiving concave portion 51c of the clutch plate 51.

Further, as illustrated in FIG. 7, the rollers 52, and six roller clamping portions 54d (illustrated in FIG. 7A) holding the rollers 52, are provided on an outer peripheral side of the holding shaft 54c.

In this embodiment, the number of the rollers is six, wherein each of the six rollers is formed in a columnar shape.

The roller clamping portions 54d are arranged circumferentially at even intervals, and each of the roller clamping portions 54d has a pair of clamping pieces 54e provided to protrude from the clutch plate-facing surface 54b toward the clutch plate 51. The pair of clamping pieces 54e are disposed in spaced-apart relation to each other by a distance approximately equal to a diameter of the roller 52.

Each of mutually opposed surfaces in the pair of clamping pieces 54e is formed in arc shape dimensionally approximately equal to an outer periphery of the roller 52. Each of the roller clamping portions 54d rotatably clamps a respective one of the rollers 52 between the opposed surfaces.

Figure 8:
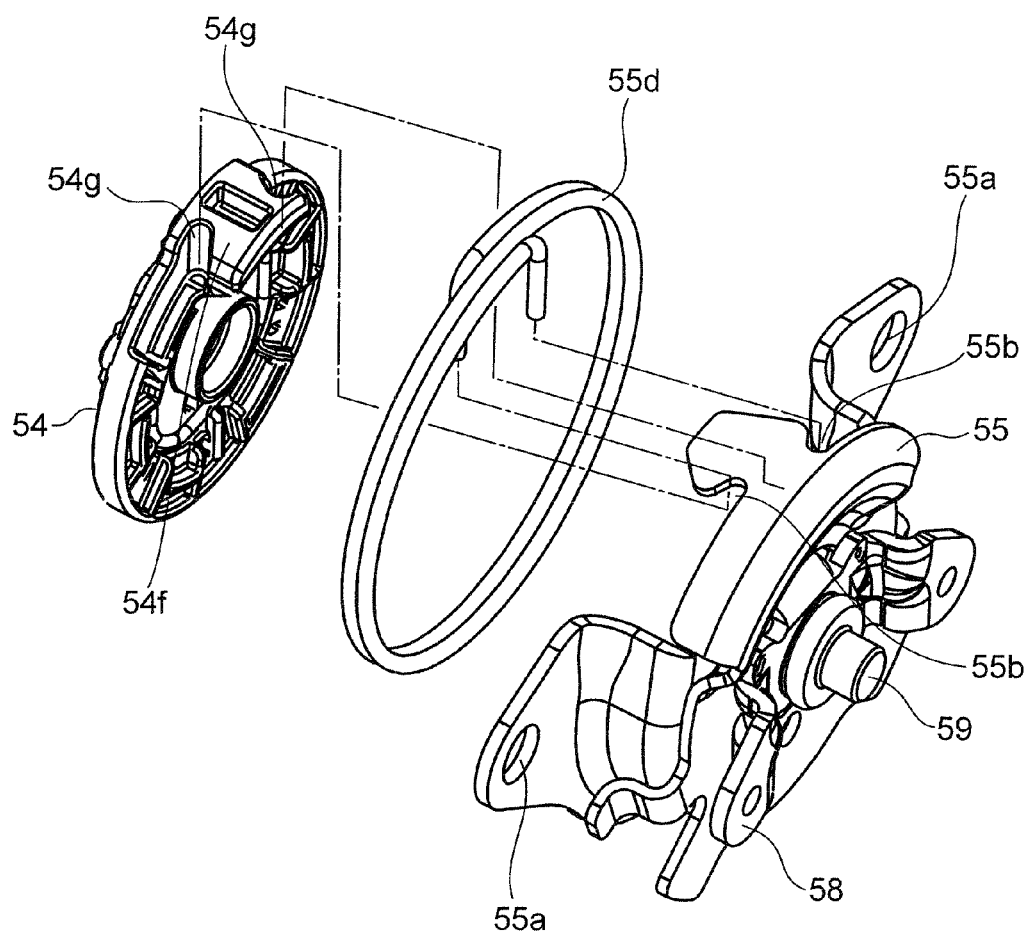
FIG. 8 is an exploded perspective view illustrating the roller clamping portion, a lever biasing spring, and a casing.

As illustrated in FIGS. 6 and 8, the holding member 54 includes a protruding piece 54f having a first spring lock portion 54g provided to protrude rightwardly from the disc-shaped portion 54a.

As illustrated in FIG. 6, the casing 55 has a fixing hole 55a serving as a frame fixing portion to be fixed to the first seat frame 3a. In this embodiment, the fixing hole 55a is formed to be superimposed on and communicated with a fixing hole 42a of the first-link coupling segment 32.

As illustrated in FIG. 1, in a state after the fixing hole 55a of the casing 55 are communicated with the fixing hole 42a of the first-link coupling segment 32, a fixing member such as a bolt is inserted thereinto, and fixed to the first seat frame 3a (first frame body 31), so that the first-link coupling segment 32 and the casing 55 are fixed to the first seat frame 3a (first frame body 31).

As illustrated in FIGS. 6 and 8, the casing 55 has a second spring lock portion 55b. A central portion of the casing 55 is rotatably attached to a central portion of the holding member 54 through a locking shaft 59.

In this attached state, opposite ends of a lever biasing spring 55d illustrated in FIG. 8 are locked, respectively, by the first spring lock portion 54g of the holding member 54 and the second spring lock portion 55b of the casing 55.

Therefore, even if the holding member 54 is rotated with respect to the casing 55 in either one of clockwise and counterclockwise directions, the lever biasing spring 55d can accumulate a biasing force to allow the holding member 54 to be moved with respect to the casing 55 and returned to a given position, according to the accumulated biasing force.

Figure 9:
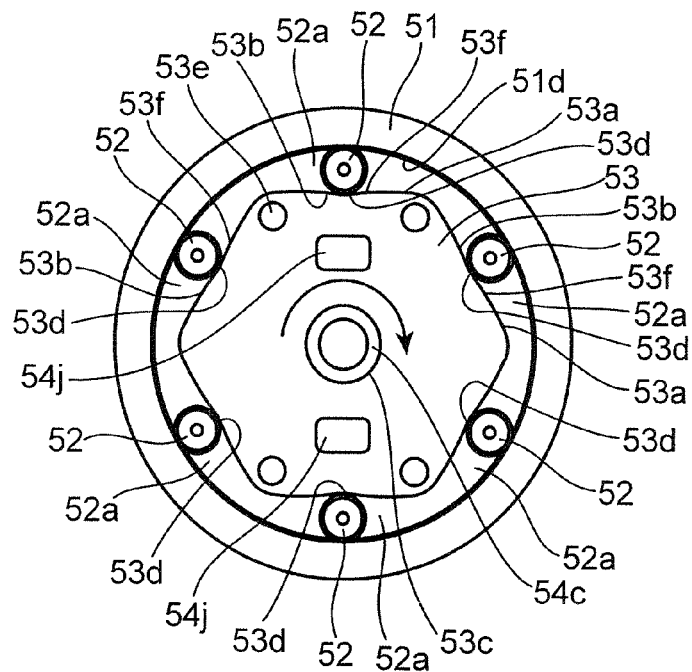
FIG. 9 is an explanatory diagram illustrating a positional relationship between respective ones of a clutch plate, a cam and a roller, in a state when an operating lever is not manipulated.

As illustrated in FIGS. 6 and 9, the cam 53 consists of a metal plate-shaped body having an outer peripheral with a generally hexagonal shape. Each of the six sides of the outer periphery of the cam 53 forms a compartment wall 53a, and a roller receiving portion 52a receiving the roller 52 therein is defined by the compartment wall 53a and an inner peripheral wall 51d of the receiving concave portion 51c of the clutch plate 51.

Each of the roller receiving portions 52a defined in the above manner is configured such that a distance between the compartment wall 53a and the inner peripheral wall 51d of the receiving concave portion 51c is maximized at a center of the compartment wall 53a, and gradually narrowed in a direction from the center to an end of the compartment wall 53a, so that a central region of the compartment wall 53a serves as a non-pressing region 53d incapable of pressing the roller 52, and opposite sides of the non-pressing region 53d serve as a first roller pressing region 53b and a second roller pressing region 53f each capable of pressing the roller 52.

In a state when the roller 52 in each of the roller receiving portions 52a is disposed between the inner peripheral wall 51d of the receiving concave portion 51c of the clutch plate 51 and the non-pressing region 53d, a slight gap is actually formed therebetween. However, such a gap is not illustrated in FIG. 9 for the sake of convenience of illustration.

The cam 53 gas a central portion provided with a holding hole 53c. The holding shaft 54c of the holding member 54 is rotatably inserted into the holding hole 53c, so that the cam 53 is rotatably held by the holding member 54.

In this held state, the cam 53 is biased by a biasing spring 50, in such a manner that it is disposed at a given position with respect to the holding member 54.

Specifically, as illustrated in FIGS. 6 and 7, the holding member 54 is provided with a spring locking hole 54j, and one end of a ring-shaped biasing spring 50 is locked in the spring locking hole 54j. On the other hand, in the state illustrated in FIG. 9 where the roller 52 held by the holding member 54 is set in the non-pressing region 53d of the cam 53, the other end of the biasing spring 50 is locked in a spring locking hole 53e provided in the cam 53.

When the cam 53 is manipulatively rotated with respect to the holding member 54 from the position illustrated in FIG. 9 in a clockwise or counterclockwise direction, the biasing spring accumulates a biasing force. Then, when a rotational operation force applied to the cam 53 is removed, the cam 53 is returned to the position illustrated in FIG. 9 where the roller 52 is set in the non-pressing region 53d, according to the accumulated biasing force.

As illustrated in FIG. 6, the operating lever 56 comprises a lever body 57, and a lever coupling piece 58 fixedly attached to the lever body 57. The lever body 57 has a grip portion 57a adapted to be gripped by an operator such as a seated person.

The lever coupling piece 58 has two locking protrusions 58a. Each of the locking protrusions 58a is inserted into a respective one of two arc-shaped first loose-fitting grooves 55i provided in the casing 55 and then inserted into a respective one of two second loose-fitting grooves 54j provided in the holding member 54. Further, it is locked in a respective one of two lever locking holes 53j provided in the cam 53, through the second loose-fitting groove 54j.

The second loose-fitting groove 54j has a length less than that of the first loose-fitting groove 55i and greater than that of the locking protrusion 58a so as to allow the locking protrusion 58a to be slightly displaced within second loose-fitting groove 54j.

In a state when the lever coupling piece 58 is locked by the cam 53, the grip portion 57a of the lever body 57 is set in an approximately horizontal posture, as illustrated in FIG. 1. In FIG. 1, the lever body 57 is indicated by a one-dot chain line, for the sake of convenience of illustration.

With reference to FIG. 4B, the second link 4b will be described below. The second link 4b is rotatably coupled to each of a rear portion of the second base member 2b (see FIG. 2) and a rear portion of the second seat frame 3b. As with the first link 4a, the second link 4b has a second link body 141 provided with a second planetary gear group 140 having a plurality of (in this embodiment, three) second planetary gears 144, in an interlockably coupled manner. However, the second link 4b is devoid of a section equivalent to the planetary-gear operating section interlocking with the first link 4a.

The second link body 141 is formed in the same structure as that of the first link body 41 of the first link 4a, and the second planetary gear 144 is formed in the same structure as that of the first planetary gear 44 in the first link 4a.

More specifically, the second link body 141 has a lower end (first end) rotatably coupled to a rear bracket of the second base member 2b, and an upper end (second end) provided with a coupling concave portion 142 and a second-link internal gear 143 (see FIG. 4B).

The second planetary gears 144 are meshed with each of the second-frame internal gear 134, the second-link internal gear 143 and the second sun gear 162, while being arranged between the second-link internal gear 143 and the second sun gear 162 and between the second-frame internal gear 134 and the second sun gear 162, circumferentially at approximately even intervals (see FIGS. 4B and 5).

As above, the second link 4b is interlockably coupled with the first link 4a through the coupling member 6. More specifically, the second link 4b is interlockably coupled with the first link 4a through the second-link internal gear 143, the second planetary gear group 140, the second sun gear 162, the coupling shaft 61, the first sun gear 62, the first planetary gear group 40 and the first-link internal gear 43.

As illustrated in FIG. 1, the third link 4c is formed to have a plate-like shape, and rotatably coupled to each of a front portion of the first base member 2a and a front portion of the first seat frame 3a. A combination of the third link 4c, the first link 4a, the first base member 2a and the first seat frame 3a makes up a parallel link mechanism.

The fourth link 4d is formed to have a shape symmetrical to that of the third link 4c, and rotatably coupled to each of a front portion of the second base member 2b and a front portion of the second seat frame 3b. A combination of the fourth link 4d, the second link 4b, the second base member 2b and the second seat frame 3b makes up a parallel link mechanism.

The lifting and lowering mechanism section will be described below. The lifting and lowering mechanism section includes a first lifting and lowering mechanism section adapted to manipulatively lift and lower the first seat frame 3a with respect to the first base member 2a; and a second lifting and lowering mechanism section adapted to manipulatively lift and lower the second seat frame 3b with respect to the second base member 2b.

The first lifting and lowering mechanism section is composed of a plurality of components including the first sun gear 62, the first link body 41, the first planetary gear group 40, and the planetary-gear operating section 5 (the clutch device (51 to 55), the operating lever 56, etc.).

The second lifting and lowering mechanism section is composed of a plurality of components including the second sun gear 162, the second link body 141, and the second planetary gear group 140.

A movement of the seat lifter according to this embodiment will be described below.

Figure 10:
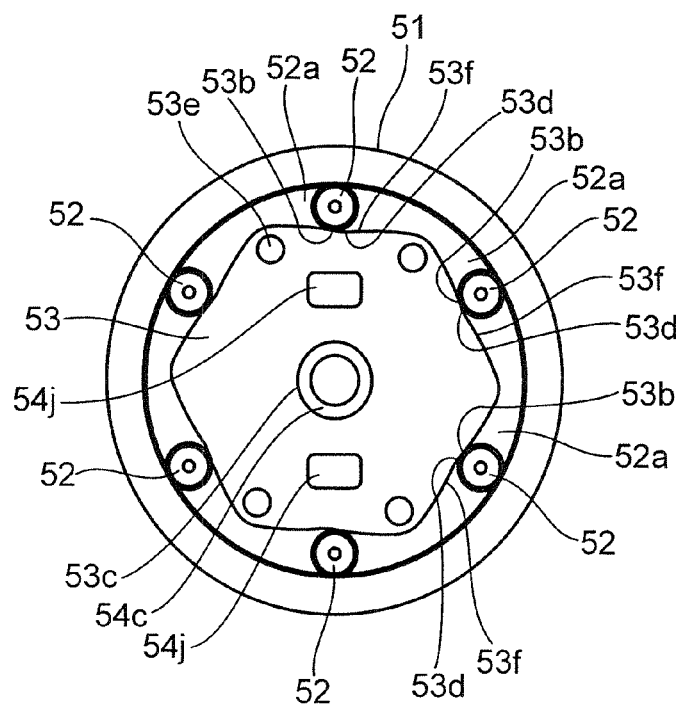
FIG. 10 is an explanatory diagram illustrating a positional relationship between respective ones of the clutch plate, the cam and the roller, in a state after the operating lever is manipulated from the position in FIG. 9.

Firstly, the grip portion 57a of the lever body 57 set in a reference horizontal position is rotationally manipulated in a clockwise direction in FIG. 1. According to this manipulation, as illustrated in FIG. 10, the cam 53 is slightly rotated with respect to the casing 55 and the clutch plate 51. Due to this rotation, each of the rollers 52 is clamped between the first roller pressing region 53b of the cam 53 and the inner peripheral wall 51d of the clutch plate 51, so that the cam 53 is locked with respect to the clutch plate 51. Although repeated, the locking protrusions 58a of the lever coupling piece 58 fixed to the operating lever 56 are adapted to be locked in the lever locking holes 53j, so as to allow the cam 53 to be rotated interlocking with the rotational manipulation of the operation lever 56.

In the locked state, when the lever body 57 is further rotationally manipulated in the clockwise direction, the clutch plate 51 is rotated in the same direction. Then, according to the rotation of the clutch plate 51, the shaft portions 44b of the first planetary gears 44 are pushed by the respective shaft insertion holes 51a of the clutch plate 51, so that each of the first planetary gears 44 is circularly moved around the first sun gear 62 and along the first-link internal gear 43 and the first-frame internal gear 34 while being meshed with the first sun gear 62, the first-link internal gear 43 and the first-frame internal gear 34.

During the circular movement along the first-link internal gear 43 and the first-frame internal gear 34, the coupling concave portion 42 of the first link body 41 is rotated with respect to the coupling convex portion 33 of the first-link coupling segment 32 in a counterclockwise direction, because the number of teeth of the first-link internal gear 43 is less than that of the first-frame internal gear 34. Thus, the first link body 41 is swingably moved about the lower end thereof in a counterclockwise direction.

Further, during the circular movement of each of the first planetary gears 44 around the first sun gear 62, the first sun gear 62 is rotated (rotated on its axis), and the second sun gear 162 engagedly fitted on the second end 6B of the coupling member 6 is rotated interlockingly with the first sun gear 62 (see FIG. 4B). Then, during the rotation of the second sun gear 162, each of the second planetary gears 144 is rotated, and circularly moved along the second-link internal gear 143 and the second-frame internal gear 134.

During this circular movement, the coupling concave portion 142 of the second link body 141 is rotated with respect to the coupling convex portion 133 of the second-link coupling segment 132 in the counterclockwise direction in interlocking relation with the first link body 41, because the number of teeth of the second-link internal gear 143 is less than that of the second-frame internal gear 134.

According to the swing movement of the first link body 41 and the second link member 141, the third link body 4c and the fourth link member 4d are swingably moved interlockingly. This allows the first and second seat frames 3a, 3b to be lifted with respect to the first and second base members 2a, 2b by a given amount.

In cases where it is necessary to further lift the first and second seat frames 3a, 3b, the operator releases his/her hand from the lever body 57 being rotationally manipulated, once. Thus, the cam 53 is biased by the biasing force of the lever biasing spring 55d through the holding member 54 in the counterclockwise direction in FIG. 10.

When the cam 53 starts rotating in the counterclockwise direction according to the biasing force, the roller 52 clamped between the first roller pressing region 53b of the cam 53 and the inner peripheral wall 51d of the clutch plate 51 will be placed in an unlocked state.

Thus, the clutch plate 51 becomes unable to be rotated together with the cam 53, and only the cam 53 is rotated in the counterclockwise direction. Therefore, in a limited range from a locked position where each of the rollers 52 is locked between the clutch plate 51 and the pressing region 53b of the cam 53 to an unlocked position where the roller 52 is located between the clutch plate 51 and the non-pressing region 53b of the cam 53, a combination of the clutch plate 51, the cam 53 and the rollers 52 makes up a one-way clutch to preclude the rotation of the clutch plate 51 and the movements of the first planetary gears 44 and the first link body 41, so that the first and second seat frame 3a, 3b are not moved with respect to the first and second base members 2a, 2b.

During the rotation of the cam 53 in the counterclockwise direction, the lever body 57 locked to the cam 53 is swingably moved in the same direction, so that the grip portion 57a is returned to its original horizontal position in FIG. 1. From this state, the lever body 57 is rotationally manipulated in the clockwise direction in FIG. 1, again, in the same manner as described above.

This allows the first and second seat frames 3a, 3b to be further lifted with respect to the first and second base members 2a, 2b by a given amount. In cases where it is necessary to additionally lift the first and second seat frames 3a, 3b with respect to the first and second base members 2a, 2b by a given amount, the above manipulation may be repeatedly performed.

Even if an external load is applied to the first and second seat frames 3a, 3b in the lifted state, each of the first planetary gears 44 is not rotated in a given direction by the external force, so that the first and second seat frames 3a, 3b will be never lowered.

On the other hand, in cases where it is necessary to lower the lifted first and second seat frames 3a, 3b, the grip portion 57a of the lever body 57 in the horizontal position may be rotationally manipulated in the counterclockwise direction in FIG. 1, contrary to the manipulation for lifting.

More specifically, according to the swing movement of the lever body 57 in the counterclockwise direction, the cam 53 is slightly rotated with respect to the casing 55 and the clutch plate 51 in the same direction. Due to this rotation, each of the rollers 52 is clamped between the second roller pressing region 53f of the cam 53 and the inner peripheral wall 51d of the clutch plate 51, so that the cam 53 is locked with respect to the clutch plate 51 (see FIG. 9).

In the locked state, when the lever body 57 is further rotationally manipulated in the counterclockwise direction, the clutch plate 51 is rotated in the same direction. Then, according to the rotation of the clutch plate 51, each of the first planetary gears 44 is circularly moved around the first sun gear 62 and along the first-link internal gear 43 and the first-frame internal gear 34, in a direction opposite to that during the manipulation for lifting.

Thus, the first link body 41 is swingably moved about the lower end thereof in the clockwise direction. Further, during the circular movement of each of the first planetary gears 44 around the first sun gear 62, the first sun gear 62 is rotated (rotated on its axis), and the second sun gear 162 is rotated interlockingly with the first sun gear 62, in the same manner as described above. Then, during the rotation of the second sun gear 162, each of the second planetary gears 144 is rotated, and circularly moved along the second-link internal gear 143 and the second-frame internal gear 134, in a direction opposite to that during the manipulation for lifting.

During this circular movement, the second link body 141 is swingably moved in interlocking relation with the first link body 41, in the same direction. According to the swing movement of the first link body 41 and the second link member 141, the third link body 4c and the fourth link member 4d are swingably moved interlockingly. This allows the first and second seat frames 3a, 3b to be lowered with respect to the first and second base members 2a, 2b by a given amount.

The seat lifter according to this embodiment is constructed in the above manner. Thus, the members for manipulatively allowing the first link to be swingably moved, such as the first planetary gears and the sun gear, can be arranged around the second end of the first link body, which makes it possible to eliminate a need for arranging the sector gear, the coupling rod, the center gear, etc., on an inner side of the seat frame, as in the conventional seat lifter, so as to facilitate an assembling operation while downsizing the seat frame.

In addition, based on the rotation of the second sun gear to be rotated interlockingly with the rotation of the first sun gear along with the manipulative swing movement of the first link, the second planetary gear group can be manipulatively rotated to allow the second link to be swingably moved.

Thus, the second link can be moved in synchronization with the movement of the first link, so that it becomes possible to smoothly lift and lower the first and second seat frames with respect to the first and second base members.

Further, the second link is swingably moved based on the rotation of the second sun gear interlocking with the first sun gear, so that the coupling shaft coupling the first sun gear and the second sun gear may be formed as a shaft for simply transmitting torque, i.e., a shaft having a small sectional area. Thus, it becomes possible to facilitate a reduction in weight of the entire seat lifter. It also becomes possible to reduce an installation area of the seat lifter. For example, in cases where this seat lifter is applied to a driver seat or a front passenger seat, it is possible to reduce a risk that a foot of a person seated in a rear seat therebehind hits against the coupling shaft.

In the above embodiment, the coupling member 6 is provided with the second sun gear 162, and the second link 4b is provided with the second planetary gear group 140 having the second planetary gears 144. However, the present invention is not limited to this embodiment, but various changes and modifications may be made therein.

For example, the coupling member 6 may be formed as a type devoid of the second sun gear 162, and the second link 4b may be a type devoid of the second planetary gears 144, wherein the seat lifter is designed such that the upper end of the second link 4b and the second end of the coupling shaft 61 are rotatably coupled, and the upper end of the second link 4b is moved interlockingly with a movement of the second end of the coupling shaft 61 caused by a movement of the first end of the coupling shaft 61.

However, in the seat lifter where the coupling member 6 is provided with the second sun gear 162, and the second link 4b is provided with the second planetary gear group 140 having the second planetary gears 144, as in the above embodiment, the second link 4b can be reliably moved at the same speed as that of the first link 4a to allow the first seat frame and the second seat frame to be reliably moved at the same timing and at the same speed, and the coupling shaft 61 may be formed as a type having a function of transmitting torque. Thus, it is preferable to employ the structure of the above embodiment.

The seat lifter of the present invention is not limited to a type for use in an automobile seat as in the above embodiment, but may be used in any other suitable type, such as an airplane seat, or a vehicle seat, e.g., a train seat, with appropriate changes and modifications. Further, the seat lifter of the present invention may be used in a power seat.

As mentioned above, according to one aspect of the present invention, there is provided a seat lifter (1) which comprises: a first link (4a) rotatably coupled to each of a first base member (2a) and a first seat frame (3a) which are disposed on one of right and left sides of a seat (100); a second link (4b) rotatably coupled to each of a second base member (2b) and a second seat frame (3b) which are disposed on the other side of the seat (100), and interlockably coupled to the first link (4a) through a coupling member (6); and a lifting and lowering mechanism section for lifting and lowering the first and second seat frames (3a, 3b) with respect to the first and second base members (2a, 2b), the lifting and lowering mechanism section including: a first lifting and lowering mechanism section having a first sun gear (62) and a first planetary gear group (40) to lift and lower the first seat frame (3a) with respect to the first base member (2a); and a second lifting and lowering mechanism section having a second sun gear (162) and a second planetary gear group (140) to lift and lower the second seat frame (3b) with respect to the second base member (2b) in interlocking relation with the first lifting and lowering mechanism section.

In the seat lifter of the present invention, the first seat frame can be lifted and lowered with respect to the first base member by the first lifting and lowering mechanism section having the first sun gear and the first planetary gear group, and the second seat frame can be lifted and lowered with respect to the second base member by the second lifting and lowering mechanism section having the second sun gear and the second planetary gear group, in interlocking relation with the first lifting and lowering mechanism section. This makes it possible to smoothly lift and lower the first and second seat frames with respect to respective ones of the first and second base members.

Preferably, in the seat lifter of the present invention, the first sun gear (62) is provided on a first end (6A) of the coupling member (6); the first planetary gear group (40) has a plurality of first planetary gears (44) each meshed with the first sun gear (62); and the first link (4a) has a first link body (41), wherein the seat lifter further comprises a planetary-gear operating section (5) adapted to manipulatively allow the first planetary gear group (40) to be circularly moved around the first sun gear (62), and wherein: the first link body (41) has a first end coupled to the first base member (2a) and a second end coupled to the first seat frame (3a), and includes a first-link internal gear (43) maintained in meshed relation with the first planetary gear group (40), and wherein the first-link internal gear (43) is adapted, concurrently with circularly moving the first planetary gear group (40) around the first sun gear (62) according to manipulation of the planetary-gear operating section (5), to allow the first planetary gear group (40) to be circularly moved therealong so as to rotate the second end of the first link body (41) with respect to the first seat frame (3a), and thereby swingably move the first link body (41) about a rotation axis (Sa) at the first end of the first link body (41).

According to this feature, the members for manipulatively allowing the first link to be swingably moved, such as the first planetary gears and the sun gear, can be arranged around the second end of the first link body, which makes it possible to facilitate an assembling operation while downsizing the seat frame.

Preferably, in the above seat lifter, the first seat frame (3a) includes a first-link coupling section (32) having a first-frame internal gear (34); the first planetary gear group (40) is further meshed with the first-frame internal gear (34) and adapted to be circularly moved along the first-frame internal gear (34); the second end of the first link body (41) is rotatably coupled to the first-link coupling section (32) in such a manner that it is rotatable with respect to the first-link coupling section (32) during the circular movement of the first planetary gear group (40) along the first-frame internal gear (34); the first sun gear (62) is provided rotatably with respect to the first seat frame (3a) in such a manner that it is rotatable on its axis during the circular movement of the first planetary gear group (40) around the first sun gear (62); the second sun gear (162) is provided on a second end of the coupling member (6) in such a manner that it is rotatable together with the first sun gear (62) interlockingly with the rotation of the first sun gear (62); the second seat frame (3b) includes a second-link coupling section (132) having a second-frame internal gear (134); the second planetary gear group (140) has a plurality of second planetary gears (144) each meshed with the second sun gear (162) and the second-frame internal gear (134); and the second link (4b) has a first end coupled to the second base member (2b) and a second end provided with a second-link internal gear (143) meshed with the second planetary gear group (140), and wherein the second end of the second link (4b) is coupled to the second-link coupling section (132) in such a manner that it is rotatable with respect to the second-link coupling section (132) when the second planetary gear group (140) is circularly moved along the second-link internal gear (143) and the second-frame internal gear (134), and wherein the second-link internal gear (143) is adapted, upon rotation of the second planetary gear group (140) caused by the rotation of the second sun gear (162), to allow the second planetary gear group (140) to be circularly moved along the second-link internal gear (143) and the second-frame internal gear (134) so as to swingably move the second link (4b) about a rotation axis (Sb) at the first end thereof.

According to this feature, based on the rotation of the second sun gear to be rotated interlockingly with the rotation of the first sun gear along with the manipulative swing movement of the first link, the second planetary gear group can be rotated to allow the second link to be swingably moved. Thus, the second link can be smoothly moved in synchronization with the movement of the first link, so that it becomes possible to smoothly lift and lower the first and second seat frames with respect to the first and second base members.

Further, the second link is swingably moved based on the rotation of the second sun gear interlocking with the first sun gear, so that the coupling member coupling the first sun gear and the second sun gear may be formed as a shaft for simply transmitting torque, i.e., a shaft having a small sectional area. Thus, it becomes possible to facilitate a reduction in weight of the entire seat lifter. For example, in cases where this seat lifter is applied to a driver seat or a front passenger seat, an installation area of the seat lifter can be reduced, so that it is possible to reduce a risk that a foot of a person seated in a rear seat therebehind hits against the coupling shaft.

According to another aspect of the present invention, there is provided a seat which comprises the above seat lifter (having any one of the above features).

In the seat of the present invention, the first seat frame can be lifted and lowered with respect to the first base member by the first lifting and lowering mechanism section having the first sun gear and the first planetary gear group, and the second seat frame can be lifted and lowered with respect to the second base member by the second lifting and lowering mechanism section having the second sun gear and the second planetary gear group, in interlocking relation with the first lifting and lowering mechanism section. This makes it possible to smoothly lift and lower the first and second seat frames with respect to respective ones of the first and second base members so as to allow the seat to be smoothly lifted and lowered in its entirety.

This application is based on Japanese Patent Application Serial No. 2010-195570, filed in Japan Patent Office on Sep. 1, 2010, and Japanese Patent Application Serial No. 2011-133034, filed in Japan Patent Office on Jun. 15, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat lifter comprising:
a first link rotatably coupled to each of a first base member and a first seat frame which are disposed on one of right and left sides of a seat;
a second link rotatably coupled to each of a second base member and a second seat frame which are disposed on the other side of the seat, and interlockably coupled to the first link through a coupling member; and
a lifting and lowering mechanism for lifting and lowering the first and second seat frames with respect to the first and second base members, the lifting and lowering mechanism including: a first lifting and lowering mechanism section having a first sun gear and a first planetary gear group to lift and lower the first seat frame with respect to the first base member; and a second lifting and lowering mechanism section having a second sun gear and a second planetary gear group to lift and lower the second seat frame with respect to the second base member in interlocking relation with the first lifting and lowering mechanism section, wherein
the first planetary gear group has a plurality of first planetary gears each meshed with the first sun gear,
the first seat frame includes a first-link coupling section having a first-frame internal gear,
the first link includes a first link body with first and second ends, the first end of the first link body being coupled rotatably to the first base member, the second end of the first link body having a first-link internal gear maintained in meshed relation with the first planetary gear group, the first-link internal gear having fewer teeth than the first-frame internal gear,
a planetary-gear operating section adapted to manipulatively allow the first planetary gear group to be moved circularly around the first sun gear, the planetary-gear operating section including a clutch plate, a cam and an operating lever, the cam being locked with the operating lever and being changeably locked and unlocked with respect to the clutch plate, the clutch plate having a shaft insertion hole rotatably receiving a shaft portion of the first planetary gears, and
the first link body is rotatable with respect to the first-link coupling section during the circular movement of the first planetary gear group around the first sun gear and along the first-frame internal gear while being meshed with the first-frame internal gear and meshed with the first-link internal gear according to manipulation of the operating lever of the planetary-gear operating section, rotational manipulation of the operating lever causing rotation of the cam that is locked with the operating lever and causing rotation of the clutch plate when the clutch plate is locked with the cam, and the first link body is swingably movable about a rotation axis at the first end of the first link body.

2. The seat lifter as defined in claim 1, wherein:
the first sun gear is provided on a first end of the coupling member.

3. The seat lifter as defined in claim 2, wherein:
the first sun gear is provided rotatably with respect to the first seat frame in such a manner that it is rotatable on its axis during the circular movement of the first planetary gear group around the first sun gear;
the second sun gear is provided on a second end of the coupling member in such a manner that it is rotatable together with the first sun gear interlockingly with the rotation of the first sun gear;
the second seat frame includes a second-link coupling section having a second-frame internal gear;
the second planetary gear group has a plurality of second planetary gears each meshed with the second sun gear and the second-frame internal gear; and
the second link has a first end coupled to the second base member and a second end provided with a second-link internal gear meshed with the second planetary gear group, the second end of the second link being coupled to the second-link coupling section in such a manner that the second link is rotatable with respect to the second-link coupling section when the second planetary gear group is circularly moved along the second-link internal gear and the second-frame internal gear, and wherein the second-link internal gear is adapted, upon rotation of the second planetary gear group caused by the rotation of the second sun gear, to allow the second planetary gear group to be circularly moved along the second-link internal gear and the second-frame internal gear so as to swingably move the second link about a rotation axis at the first end thereof.

4. A seat comprising the seat lifter as defined in claim 1.
5. A seat comprising the seat lifter as defined in claim 2.
6. A seat comprising the seat lifter as defined in claim 3.

* * * * *